(12) United States Patent
Sun

(10) Patent No.: US 9,756,472 B2
(45) Date of Patent: Sep. 5, 2017

(54) METHOD AND SYSTEM FOR PROMPTING SIGNAL COVERED AREA

(71) Applicant: ZTE CORPORATION, Shenzhen, Guangdong Province (CN)

(72) Inventor: Gengmao Sun, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 0 days.

(21) Appl. No.: 14/894,331

(22) PCT Filed: Jul. 24, 2013

(86) PCT No.: PCT/CN2013/080045
§ 371 (c)(1),
(2) Date: Nov. 25, 2015

(87) PCT Pub. No.: WO2013/185686
PCT Pub. Date: Dec. 19, 2013

(65) Prior Publication Data
US 2016/0112842 A1 Apr. 21, 2016

(30) Foreign Application Priority Data
May 28, 2013 (CN) .......................... 2013 1 0207977

(51) Int. Cl.
H04W 4/02 (2009.01)
H04W 64/00 (2009.01)
H04W 16/18 (2009.01)
H04B 17/318 (2015.01)
H04W 4/04 (2009.01)

(52) U.S. Cl.
CPC .......... H04W 4/025 (2013.01); H04B 17/318 (2015.01); H04W 4/022 (2013.01);
(Continued)

(58) Field of Classification Search
CPC ..... H04W 4/025; H04W 4/022; H04W 16/18; H04W 64/006; H04B 17/318
See application file for complete search history.

(56) References Cited

U.S. PATENT DOCUMENTS

2005/0130677 A1* 6/2005 Meunier ................. G01S 5/021
455/456.6
2006/0183487 A1 8/2006 Allen et al.
(Continued)

FOREIGN PATENT DOCUMENTS

CN 102202421 A 9/2011
CN 102611747 A 7/2012
(Continued)

*Primary Examiner* — Qun Shen
(74) *Attorney, Agent, or Firm* — Ling Wu; Stephen Yang; Ling and Yang Intellectual Property

(57) ABSTRACT

A method and a system for prompting a signal coverage area are disclosed, which relate to the field of mobile communications. The method for prompting the signal coverage area disclosed in the embodiment of the present document includes: when detecting a signal coverage area searching instruction from a user, a mobile terminal performs positioning operation, acquiring current location information of the mobile terminal, and according to signal strength around a current location of the mobile terminal, determining a list of blind areas around the current location; and the mobile terminal prompting the user to open a map, and displaying the current location of the mobile terminal on the map, and displaying signal coverage areas near the current location according to the list of blind areas. The embodiment of the present document also discloses a system for prompting a signal coverage area.

10 Claims, 1 Drawing Sheet

(52) U.S. Cl.
CPC ......... *H04W 16/18* (2013.01); *H04W 64/006* (2013.01); *H04W 4/027* (2013.01); *H04W 4/04* (2013.01); *H04W 64/00* (2013.01)

(56) References Cited

U.S. PATENT DOCUMENTS

| | | | | |
|---|---|---|---|---|
| 2008/0102809 | A1* | 5/2008 | Beyer | G01C 21/00 455/420 |
| 2008/0268830 | A1* | 10/2008 | Sharma | H04W 4/02 455/421 |
| 2011/0130135 | A1 | 6/2011 | Trigui | |
| 2011/0163914 | A1* | 7/2011 | Seymour | G01S 19/05 342/357.42 |
| 2011/0317662 | A1 | 12/2011 | Choi et al. | |
| 2012/0008595 | A1* | 1/2012 | Wang | H04W 36/385 370/331 |
| 2012/0172033 | A1* | 7/2012 | Hilton | G01S 19/14 455/423 |
| 2014/0067257 | A1* | 3/2014 | Dave | G01C 21/3461 701/423 |
| 2014/0335795 | A1* | 11/2014 | Wilbur | H04W 24/08 455/67.11 |
| 2015/0369900 | A1* | 12/2015 | Pan | G01S 5/0252 455/456.6 |

FOREIGN PATENT DOCUMENTS

| | | |
|---|---|---|
| CN | 102781071 A | 11/2012 |
| WO | 0145441 A2 | 6/2001 |

* cited by examiner

METHOD AND SYSTEM FOR PROMPTING SIGNAL COVERED AREA

TECHNICAL FIELD

The present document relates to the field of mobile communications, and particularly, to a method and a system for prompting a wireless signal coverage area.

BACKGROUND OF THE RELATED ART

With the rapid development of the mobile communication technology, mobile terminal devices represented by mobile phones bring a great convenience to people's life, but all these are based on good network coverage. However, according to the characteristics of the mobile communication network itself and the operator's consideration on the investment costs, the mobile network is impossible or is also difficult to cover all corners where a mobile terminal may reach, such as in mountainous areas, at sea, in the desert, at the underground garage and at high-rise included angle places and so on, and even a large no signal area exists in the mountainous areas, at sea or in the desert. The necessary being of these wireless network coverage blind areas brings a lot of inconveniences to a mobile terminal user, which greatly affects the user experience. In order to make up inconveniences brought to the user from these wireless network coverage blind areas, certain effective prompts can be given to the user in the signal coverage blind areas, so as to help the user rapidly locate a signal coverage area nearby, thereby reducing or avoiding the loss which the signal blind areas may bring to the user, and improving the user experience.

In the related art, an effective and feasible method that can help the user in the wireless network coverage blind areas rapidly locate a signal coverage area nearby has not been found. When the user in the network coverage blind areas wants to make a call or send a message, the common practice is to blindly move to an area where the user thinks there may be signals based on sensation or previous experiences, unfortunately an opposite case often occurs, it is to deviate from the signal coverage area as moving along, the user experience is affected greatly, and a delay in work is often caused, so that a plurality of services such as calls, short message transceiving and mail transceiving required to be completed through the mobile network cannot be processed in time for a wireless signal coverage area is not found.

SUMMARY

The technical problem required to be solved in the embodiments of the present document is to provide a method and a system for prompting a signal coverage area, to help a user in wireless network coverage blind areas rapidly locate a signal coverage area nearby, thereby improving the user experience.

In order to solve the above technical problem, the embodiment of the present document discloses a method for prompting a signal coverage area, which comprises:

when detecting a signal coverage area searching instruction from a user, a mobile terminal performing a positioning operation, acquiring current location information of the mobile terminal, and according to signal strength around the current location of the mobile terminal, determining a list of blind areas around the current location; and the mobile terminal prompting the user to open a map, and displaying the current location of the mobile terminal on the map, and displaying signal coverage areas near the current location according to the list of blind areas.

Alternatively, the above method further comprises: the mobile terminal displaying a signal coverage area closest to the current location on the map, and labeling a movement direction and a straight-line distance from the current location to the area.

Alternatively, the above method further comprises:

the mobile terminal detecting received wireless signal strength, when the received wireless signal strength hops from a value less than or equal to a preset blind area signal strength threshold value to a value greater than the preset blind area signal strength threshold value, the mobile terminal performing the positioning operation again to acquire current location information of the mobile terminal;

if no record for location information identical or approximately identical with the current location information of the mobile terminal exists in the list of blind areas, the mobile terminal taking the current location information of the mobile terminal as location information of a new blind area boundary point to be stored into the list of blind areas;

wherein, the approximately identical location information refers to: a distance between locations corresponding to two pieces of location information being less than or equal to a blind area distance differential threshold value.

Alternatively, the above method further comprises: when the mobile terminal detects that the received wireless signal strength is greater than the preset blind area signal strength threshold value, and a distance between the current location corresponding to the current location information of the mobile terminal and location(s) of one or more blind area boundary points recorded in the list of blind areas is less than or equal to a preset blind area distance differential threshold value, the mobile terminal deleting a record for a blind area boundary point with a distance to the current location of the mobile terminal that is less than or equal to a preset blind area distance threshold value from the list of blind areas.

Alternatively, in the above method, the current location information of the mobile terminal comprises: longitude and latitude coordinates where the mobile terminal is located.

The embodiment of the present document further discloses a system for prompting a signal coverage area, which comprises:

a positioning module, configured to: when a signal coverage area searching instruction from a user is detected, perform a positioning operation on a current mobile terminal, to acquire current location information of the mobile terminal;

a blind area list information determination module, configured to: according to signal strength around the current location of the mobile terminal, determine a list of blind areas around the current location; and a signal coverage area indication module, configured to: after the user opens a map, display the current location of the mobile terminal and signal coverage areas near the current location of the mobile terminal on the map.

Alternatively, in the above system, the signal coverage area indication module is further configured to: display a signal coverage area closest to the current location on the map, and label a movement direction and a straight-line distance from the current location to the closest area.

Alternatively, the above system further comprises a signal detection module and a blind area list information maintenance module, wherein:

the signal detection module is configured to: detect received wireless signal strength, when the received wireless signal strength hops from a value less than or equal to a preset blind area signal strength threshold value to a value greater than the preset blind area signal strength threshold value, notify the positioning module to perform the positioning operation again to acquire current location information of the mobile terminal; and the blind area list information maintenance module is configured to: when no record for location information identical or approximately identical with the current location information of the mobile terminal exists in the list of blind areas, take the current location information of the mobile terminal as location information of a new blind area boundary point to be stored into the list of blind areas, wherein, the approximately identical location information refers to: a distance between locations corresponding to two pieces of location information being less than or equal to a blind area distance differential threshold value.

Alternatively, in the above system, when the signal detection module detects that the received wireless signal strength is greater than the preset blind area signal strength threshold value, and a distance between the location corresponding to the current location information of the mobile terminal and location(s) of one or more blind area boundary points recorded in the list of blind areas is less than or equal to a preset blind area distance differential threshold value, the blind area list information maintenance module deletes a record for a blind area boundary point with a distance to the current location of the mobile terminal that is less than or equal to a preset blind area distance threshold value from the list of blind areas.

Alternatively, in the above system, the current location information of the mobile terminal comprises: longitude and latitude coordinates where the mobile terminal is located.

The technical scheme of the present application can be applied to a mobile terminal, which can help a terminal user rapidly find a nearby signal coverage area when the mobile terminal is located in an area where there is no signal coverage, so as to improve the user experience. Moreover, to implement the embodiments of the present document, almost no additional cost is required with regard to mobile terminals with a common positioning function.

PREFERRED EMBODIMENTS OF THE INVENTION

The embodiments of the present document will be described in detail in combination with the accompanying drawings below. It should be noted that the embodiments in the present document and the characteristics in the embodiments can be optionally combined with each other in the condition of no conflict.

Embodiment 1

Figure 1:
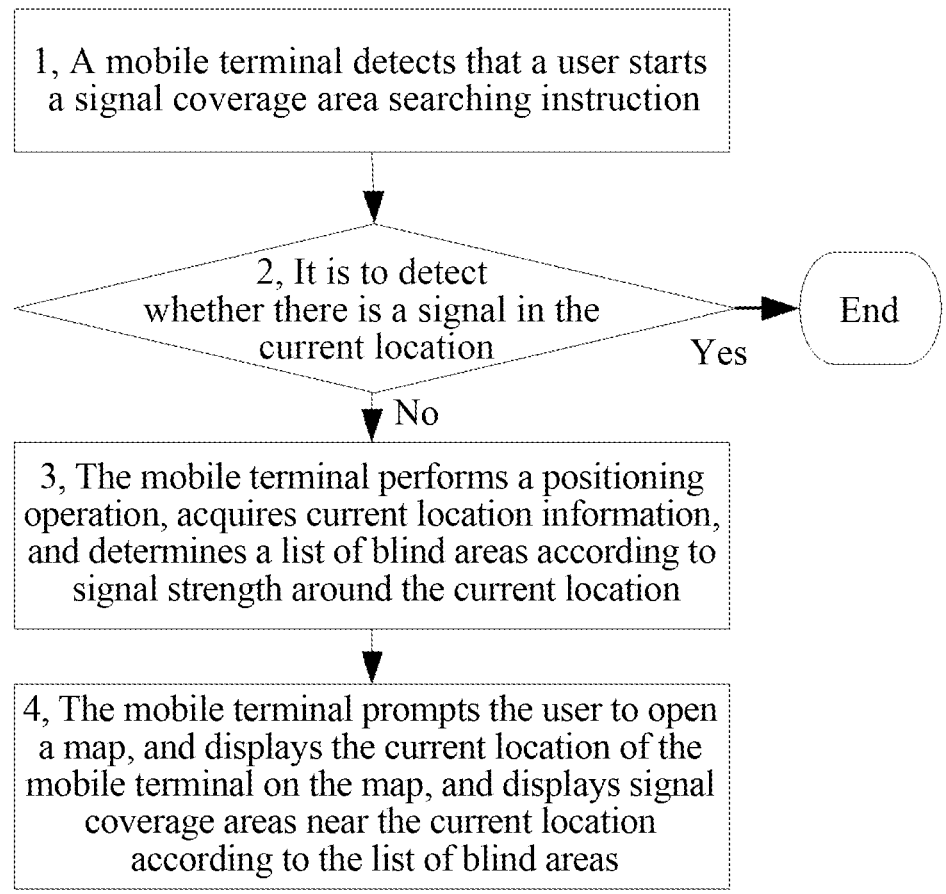
FIG. 1 is a flow chart of a method for prompting a signal coverage area according to the embodiment of the present document.

The embodiment provides a method for prompting a signal coverage area, an implementation process thereof is as shown in FIG. 1, and the following operations are included:

In step 1, a mobile terminal detects that a user starts a signal coverage area searching instruction;

In step 2, the mobile terminal detects whether there is a signal in the current location, if there is a signal in the current location, the flow ends, and if there is no signal in the current location, step 3 is executed.

In step 3, the mobile terminal performs a positioning operation, acquires current location information, and determines a list of blind areas according to signal strength around the current location.

In the step, the mobile terminal determining the list of blind areas according to the signal strength around the current location refers to:

the mobile terminal locally generating the list of blind areas according to the signal strength around the current location; or the mobile terminal acquiring the list of blind areas around the current location from a network side.

In step 4, the mobile terminal prompts the user to open a map, and displays the current location of the mobile terminal on the map, and displays signal coverage areas near the current location according to the list of blind areas.

In the above step 4, the signal coverage areas near the current location can be highlighted on the map according to the information of the list of blind areas, and areas that are not in the list of blind areas are considered as the signal coverage areas, and then the signal coverage areas can be highlighted.

In addition, based on the above flow, the mobile terminal also can particularly label a signal coverage area closest to the current location on the map, and label a movement direction and a straight-line distance from the current location to the area.

In addition, in considering that the signal strength may be changed in real time, a preferred scheme proposes that the mobile terminal can detect received wireless signal strength in real time, and maintain the information of the list of blind areas according to a detection result. For example, location information of a blind area boundary point is added in the list of the bind areas, and the process is as follows:

it is to detect whether the wireless signal strength received by the mobile terminal hops from less than or equal to a preset blind area signal strength threshold value to greater than the preset blind area signal strength threshold value, if the wireless signal strength received by the mobile terminal hops from less than or equal to the preset blind area signal strength threshold value to greater than the preset blind area signal strength threshold value, it is to perform positioning on the mobile terminal to acquire the current location information of the mobile terminal;

it is to judge whether a record for location information identical or approximately identical with the current location information of the mobile terminal exists in the list of blind areas, if the record for the location information identical or approximately identical with the current location information of the mobile terminal exists in the list of blind areas, the following operation will not be continued, and if no record for the location information identical or approximately identical with the current location information of the mobile terminal exists in the list of blind areas, it is to take the current location information of the mobile terminal as location information of a new blind area boundary point to be stored in the list of blind areas. It should be noted that two pieces of location information being approximately identical refers to: a distance between locations corresponding to the two pieces of location information being less than or equal to a blind area distance differential threshold value;

wherein, the blind area distance differential threshold value can be set according to a coverage area of a base station of the wireless network and a dispersion of blind area boundary points.

The wireless signal received by the mobile terminal can be but not limited to one of GSM, CDMA, WCDMA, TD-SCDMA, WiMAX and LTE signals.

Specifically, the wireless signal strength can be measured through signal sensitivity or a ratio of energy per bit to interference density;

with regard to a CDMA network, when the wireless signal strength is measured through the signal sensitivity, the preset blind area signal strength threshold value can be set as −105 dbm; and when the wireless signal strength is measured through the ratio of energy per bit to interference density, the preset blind area signal strength threshold value can be set as −15 db.

Moreover, a blind area distance threshold value can be set in combination with a specific wireless network type; for example, with regard to the CDMA network, it can be set as 100 meters.

For another example, a processing process of deleting the location information of the blind area boundary point from the list of blind areas is as follows:

if it is detected that the wireless signal strength currently received by the mobile terminal is greater than the preset blind area signal strength threshold value, and a distance between the current location of the mobile terminal and location(s) of one or more blind area boundary points recorded in the list of blind areas is less than or equal to a preset blind area distance threshold value, it is to delete a record for the blind area boundary point with a distance to the current location of the mobile terminal that is less than or equal to the preset blind area distance threshold value from the list of blind areas.

For example, with respect to the processing of deleting the location information of the blind area boundary point from the list of blind areas, it is assumed that three blind area boundary points are contained in the list of blind areas, a blind area distance threshold value is set as 100 meters, if wireless signal strength currently received by the mobile terminal is greater than the preset blind area signal strength threshold value, and after positioning is performed on the mobile terminal, the calculated distance values L between the current location of the mobile terminal and the locations of the three blind area boundary points in the list of blind areas are as follows: L1=150 meter, L2=60 meter and L3=600 meter, thus, only the L2 is less than the blind area distance threshold value, and a record for the location of the blind area boundary point corresponding to the L2 is deleted from the list of blind areas.

Wherein, performing positioning on the mobile terminal includes: performing positioning on the mobile terminal via a global positioning system GPS positioning module, or performing positioning on the mobile terminal via a WiFi positioning module, or performing positioning on the mobile terminal via a base station positioning module, or performing positioning on the terminal via a network assisted global positioning system (AGPS) module, or performing positioning on the mobile terminal via other positioning modules that are not completely dependent on the current positioning mode of the wireless network. Various positioning modes can be used in combination. Alternatively, the AGPS module is selected to perform positioning on the mobile terminal.

Wherein, the current location information of the mobile terminal includes: geographical location coordinates of the mobile terminal, such as longitude and latitude coordinates where the mobile terminal is located.

The highlighted display involved in the above flow can be implemented through any one or a combination of the following ways: different colors, twinkling, highlighting, arrow indication and different icon displays and so on.

Embodiment 2

Figure 2:
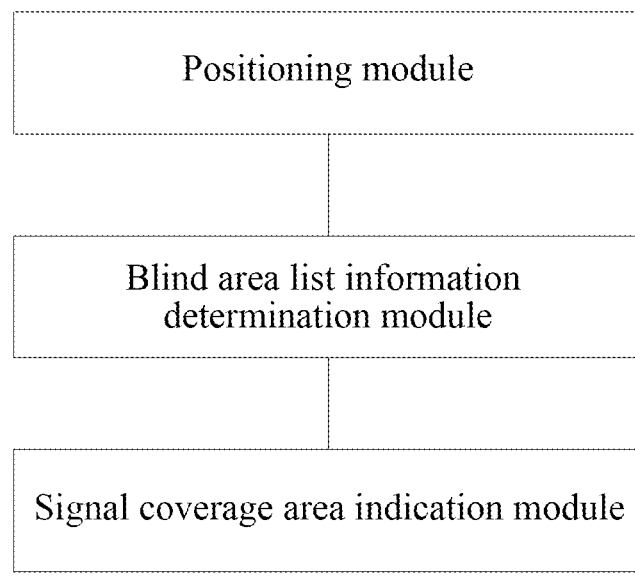
FIG. 2 is a schematic diagram of a structure of a system for prompting a signal coverage area according to the embodiment of the present document.

The embodiment provides a system for prompting a signal coverage area, which can be applied to a mobile terminal. The architecture of the system is as shown in FIG. 2, and the following modules are included.

a positioning module is configured to: perform positioning on the mobile terminal to acquire current location information of the mobile terminal;

a blind area list information determination module is configured to: according to signal strength around a current location of the mobile terminal acquired by the positioning module, determine a list of blind areas around the current location;

the blind area list information determination module can be configured to determine the list of blind areas around the current location by means of: locally and initiatively generating the list of blind areas around the current location at the mobile terminal, or acquiring the list of blind areas around the current location from the network side.

A signal coverage area indication module is configured to: highlight the current location of the mobile terminal and signal coverage areas near the current location of the mobile terminal on the map.

In certain schemes, the signal coverage area indication module also can be configured to: particularly label a signal coverage area closest to the current location on the map, and label a movement direction and a straight-line distance from the current location to the area.

In addition, the system for prompting the signal coverage area also can include a signal detection module and a blind area list information maintenance module.

The signal detection module is configured to detect received wireless signal strength;

the blind area list information maintenance module is configured to: according to a change of the wireless signal strength detected by the signal detection module, perform operations such as addition and deletion to the blind area list information.

Specifically, the blind area information maintenance module can be mainly divided into two submodules: a blind area list information addition submodule and a blind area list information deletion submodule; wherein, the signal detection module is configured to: when it is detected that the received wireless signal strength hops from less than or equal to a preset blind area signal strength threshold value to greater than the preset blind area signal strength threshold value, notify the positioning module to perform the positioning operation on the mobile terminal and acquire the current location information of the mobile terminal;

at this point, if no record for the location information identical or approximately identical with the current location information of the mobile terminal exists in the list of blind areas, the blind area list information addition submodule takes the current location information of the mobile terminal as location information of a new blind area boundary point to be stored in the list of blind areas; it should be noted that two pieces of location information being approximately identical refers to: a distance between locations corresponding to the two pieces of location information being less than or equal to a distance differential threshold value.

And when the signal detection module detects that the wireless signal strength currently received by the mobile terminal is greater than the preset blind area signal strength threshold value, and a distance between the current location of the mobile terminal and location(s) of one or more blind area boundary points recorded in the list of blind areas is less than or equal to a preset blind area distance threshold value, the blind area list information deletion submodule deletes a record for a blind area boundary point with a distance to the current location of the mobile terminal that is less than or equal to the preset blind area distance threshold value from the list of blind areas.

Wherein, the current location information of the mobile terminal includes: longitude and latitude coordinates where the mobile terminal is located.

In addition, it should be particularly noted that, in all the contents of the present document and specific embodiments described above, the function of maintaining the blind area list information is contained, and the mobile terminal obtains the prior data through training or learning by itself in the above description, to complete the maintenance of the blind area list information. If the related network coverage information can be acquired from the operator or cloud in future, the maintenance of the blind area list information is easier and more comprehensive, and maintaining the blind area list information with this method also belongs to the protection scope of the present document. The maintenance of the blind area list information includes operations such as addition and deletion of the blind area list information.

The ordinary person skilled in the art can understand that all or part of the steps in the above method can be completed by a program instructing related hardware, and the program can be stored in a computer readable memory medium, such as a read-only memory, disk or optical disk and so on. Alternatively, all or part of the steps of the above examples also can be implemented by using one or multiple integrated circuits. Correspondingly, each module/unit in the above examples can be implemented in a form of hardware, and also can be implemented in a form of software function module. The embodiment of the present document is not limited to any combination of hardware and software in a specific form.

The above embodiments are only used to describe the technical scheme of the present document, which does not limit the technical scheme of the present document. The present document is just described in detail with reference to the preferred embodiments. The ordinary person skilled in the art should understand that, with regard to the technical scheme of the present document, modifications or equivalent substitutions can be made without departing from the spirit and scope of the technical scheme of the present document, and all these modifications and equivalent substitutions should be covered within the scope of the claims of the present document.

INDUSTRIAL APPLICABILITY

The technical scheme of the present document can be applied to a mobile terminal, which can help a terminal user rapidly find a nearby signal coverage area when the mobile terminal is located in an area where there is no signal coverage, so as to improve the user experience. Moreover, to implement the embodiments of the present document, almost no additional cost is required with regard to mobile terminals with a common positioning function.

What is claimed is:

1. A method for prompting a signal coverage area, comprising:
   when detecting a signal coverage area searching instruction from a user, a mobile terminal performing a positioning operation, acquiring current location information of the mobile terminal, and according to signal strength around the current location of the mobile terminal, determining a list of blind areas around the current location; and
   the mobile terminal prompting the user to open a map, and displaying the current location of the mobile terminal on the map, and displaying signal coverage areas near the current location according to the list of blind areas;
   the mobile terminal detecting received wireless signal strength, when the mobile terminal detects that the received wireless signal strength is greater than the preset blind area signal strength threshold value, and that a distance between the current location corresponding to the current location information of the mobile terminal and location of one or more blind area boundary points recorded in the list of blind areas is less than or equal to a preset blind area distance differential threshold value, the mobile terminal deleting a record for a blind area boundary point with a distance to the current location of the mobile terminal that is less than or equal to a preset blind area distance threshold value from the list of blind areas.

2. The method according to claim 1, further comprising:
   the mobile terminal displaying a signal coverage area closest to the current location on the map, and labeling a movement direction and a straight-line distance from the current location to the area.

3. The method according to claim 1, further comprising:
   when the received wireless signal strength hops from a value less than or equal to a preset blind area signal strength threshold value to a value greater than the preset blind area signal strength threshold value, the mobile terminal performing the positioning operation again to acquire current location information of the mobile terminal;
   if no record for location information identical or approximately identical with the current location information of the mobile terminal exists in the list of blind areas, the mobile terminal taking the current location information of the mobile terminal as location information of a new blind area boundary point to be stored into the list of blind areas;
   wherein, the approximately identical location information refers to: a distance between locations corresponding to two pieces of location information being less than or equal to a blind area distance differential threshold value.

4. The method according to claim 3, wherein, the current location information of the mobile terminal comprises: longitude and latitude coordinates where the mobile terminal is located.

5. The method according to claim 2, further comprising:
   the mobile terminal detecting received wireless signal strength, when the received wireless signal strength hops from a value less than or equal to a preset blind area signal strength threshold value to a value greater than the preset blind area signal strength threshold value, the mobile terminal performing the positioning operation again to acquire current location information of the mobile terminal;

if no record for location information identical or approximately identical with the current location information of the mobile terminal exists in the list of blind areas, the mobile terminal taking the current location information of the mobile terminal as location information of a new blind area boundary point to be stored into the list of blind areas;

wherein, the approximately identical location information refers to: a distance between locations corresponding to two pieces of location information being less than or equal to a blind area distance differential threshold value.

6. A system for prompting a signal coverage area, comprising:

a positioning module, configured to: when detecting a signal coverage area searching instruction from a user, perform a positioning operation on a current mobile terminal, to acquire current location information of the mobile terminal;

a blind area list information determination module, configured to: according to signal strength around the current location of the mobile terminal, determine a list of blind areas around the current location; and a signal coverage area indication module, configured to: after the user opens a map, display the current location of the mobile terminal and signal coverage areas near the current location of the mobile terminal on the map;

wherein the system further comprises: a signal detection module and a blind area list information maintenance module, wherein:

the signal detection module is configured to: detect received wireless signal strength;

when the signal detection module detects that the received wireless signal strength is greater than the preset blind area signal strength threshold value, and that a distance between the current location corresponding to the current location information of the mobile terminal and location of one or more blind area boundary points recorded in the list of blind areas is less than or equal to a preset blind area distance differential threshold value, the blind area list information maintenance module deletes a record for a blind area boundary point with a distance to the current location of the mobile terminal that is less than or equal to a preset blind area distance threshold value from the list of blind areas.

7. The system according to claim 6, wherein, the signal coverage area indication module is further configured to: display a signal coverage area closest to the current location on the map, and label a movement direction and a straight-line distance from the current location to the closest area.

8. The system according to claim 6, wherein:

when the received wireless signal strength hops from a value less than or equal to a preset blind area signal strength threshold value to a value greater than the preset blind area signal strength threshold value, the signal detection module notify the positioning module to perform the positioning operation again to acquire current location information of the mobile terminal; and the blind area list information maintenance module is configured to: when no record for location information identical or approximately identical with the current location information of the mobile terminal exists in the list of blind areas, take the current location information of the mobile terminal as location information of anew blind area boundary point to be stored into the list of blind areas, wherein, the approximately identical location information refers to: a distance between locations corresponding to two pieces of location information being less than or equal to a blind area distance differential threshold value.

9. The system according to claim 8, wherein, the current location information of the mobile terminal comprises: longitude and latitude coordinates wherein the mobile terminal is located.

10. The system according to claim 7, further comprising: a signal detection module and a blind area list information maintenance module, wherein:

the signal detection module is configured to: detect received wireless signal strength, when the received wireless signal strength hops from a value less than or equal to a preset blind area signal strength threshold value to a value greater than the preset blind area signal strength threshold value, notify the positioning module to perform the positioning operation again to acquire current location information of the mobile terminal; and the blind area list information maintenance module is configured to: when no record for location information identical or approximately identical with the current location information of the mobile terminal exists in the list of blind areas, take the current location information of the mobile terminal as location information of anew blind area boundary point to be stored into the list of blind areas, wherein, the approximately identical location information refers to: a distance between locations corresponding to two pieces of location information being less than or equal to a blind area distance differential threshold value.

* * * * *